United States Patent
Balasubramanian et al.

(10) Patent No.: US 8,010,708 B2
(45) Date of Patent: *Aug. 30, 2011

(54) SERIAL PORT INITIALIZATION IN STORAGE SYSTEM CONTROLLERS

(75) Inventors: Sridhar Balasubramanian, Wichita, KS (US); Pramodh Mereddy, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 12/184,961

(22) Filed: Aug. 1, 2008

(65) Prior Publication Data
US 2008/0288660 A1 Nov. 20, 2008

Related U.S. Application Data

(63) Continuation of application No. 10/706,623, filed on Nov. 12, 2003, now Pat. No. 7,415,543.

(51) Int. Cl.
*G06F 3/00* (2006.01)
(52) U.S. Cl. .............................. 710/2; 710/10
(58) Field of Classification Search ............... 710/2, 10
See application file for complete search history.

(56) References Cited

U.S. PATENT DOCUMENTS

| | | | |
|---|---|---|---|
| 4,999,766 A | 3/1991 | Peters et al. | |
| 5,008,936 A * | 4/1991 | Hamilton et al. | 380/281 |
| 5,559,958 A | 9/1996 | Farrand et al. | |
| 6,072,827 A | 6/2000 | Krulce | |
| 6,480,958 B1 | 11/2002 | Harrington | |
| 6,625,144 B1 * | 9/2003 | El-Batal et al. | 370/364 |
| 6,847,615 B1 | 1/2005 | Walter et al. | |
| 6,915,363 B2 | 7/2005 | Wood et al. | |
| 2002/0112186 A1 * | 8/2002 | Ford et al. | 713/201 |

OTHER PUBLICATIONS

Lecture notes by Hollingsworth, 1997 http://www.cs.umd.edu/~hollings/cs417/s97/lectures/lect13/lect13.pdf.

* cited by examiner

*Primary Examiner* — Chun-Kuan Lee
(74) *Attorney, Agent, or Firm* — Yee & Associates, P.C.

(57) ABSTRACT

A boot menu is provided for manual setting of serial port parameters. A serial console mode menu allows an operator to set serial port parameter values. After the user selects the serial port parameters, when the controller continues with the boot process, the serial port is initialized with the newly selected parameters. A mechanism is also provided for manual setting of serial port parameters through an administrative management window at the host. In addition, an adaptive baud rate negotiation mechanism using the Universal Asynchronous Receiver Transmitter (UART) registers in the serial port is provided. The adaptive baud rate negotiation is based on the return characters received from a break character from the serial console. The mechanism uses a look-up table for the baud rate versus the bit pattern that is received. The mechanism then sets the baud rate based on the look-up table values.

16 Claims, 6 Drawing Sheets

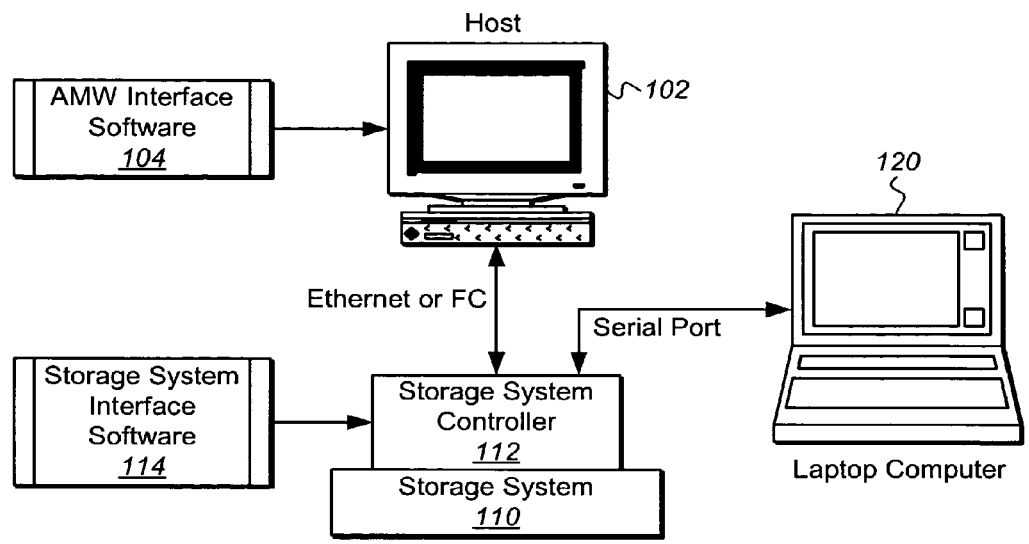
FIG._1
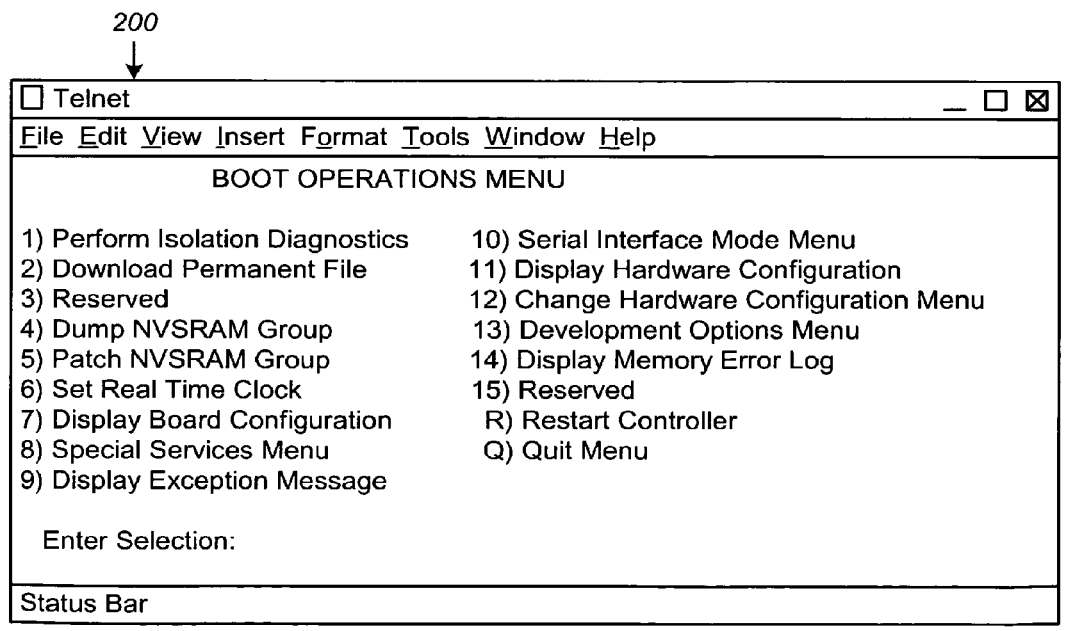
FIG._2

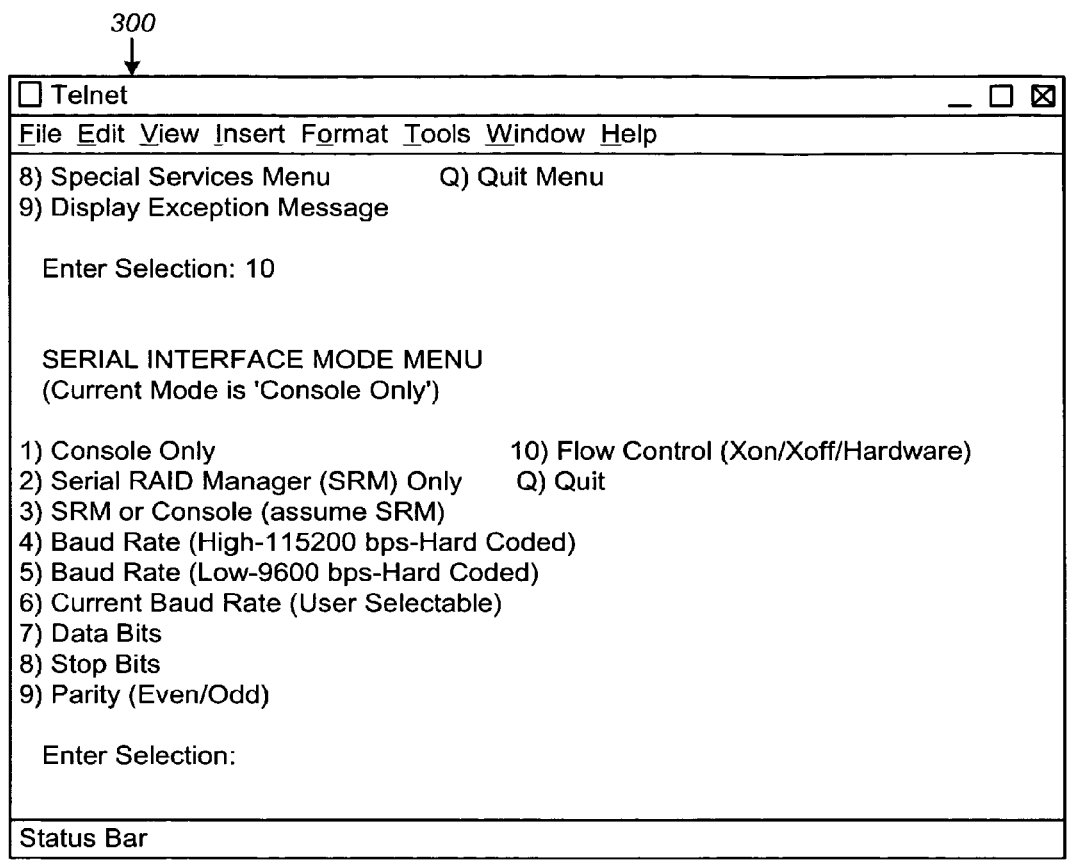
FIG._3

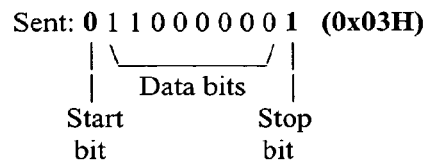
FIG._4A
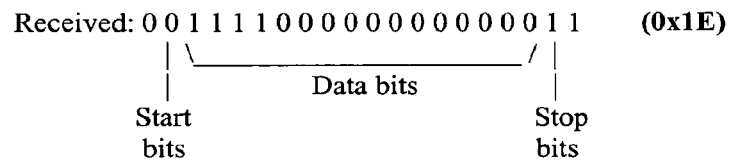
FIG._4B
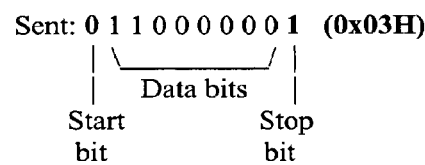
FIG._5A
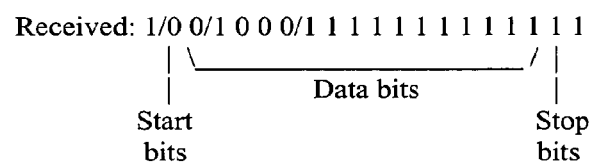
FIG._5B
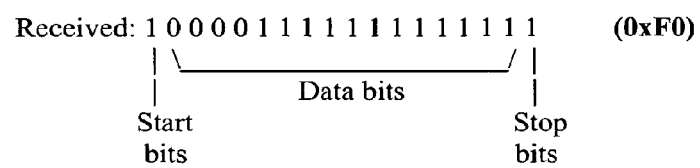
FIG._5C

| Sender baud | Receiver baud | Sent pattern | Received pattern | Timer value | Algorithm |
|---|---|---|---|---|---|
| 19200 | 9600 | 0x03h | 0xF0 | T/2 | 2bits sent by sender will be 1bit received at the receiver |
| 9600 | 9600 | 0x03h | 0x03h | T | Bits sent = Bits received |
| 19200 | 38400 | 0x03h | 0x1Eh | 2T | For every bit sent by the sender, the receiver will get 2 bits |
| 2400 | 9600 | 0x03h | 0xF8 | 4T | For every bit sent by the sender, the receiver will get 2 bits |
FIG._6
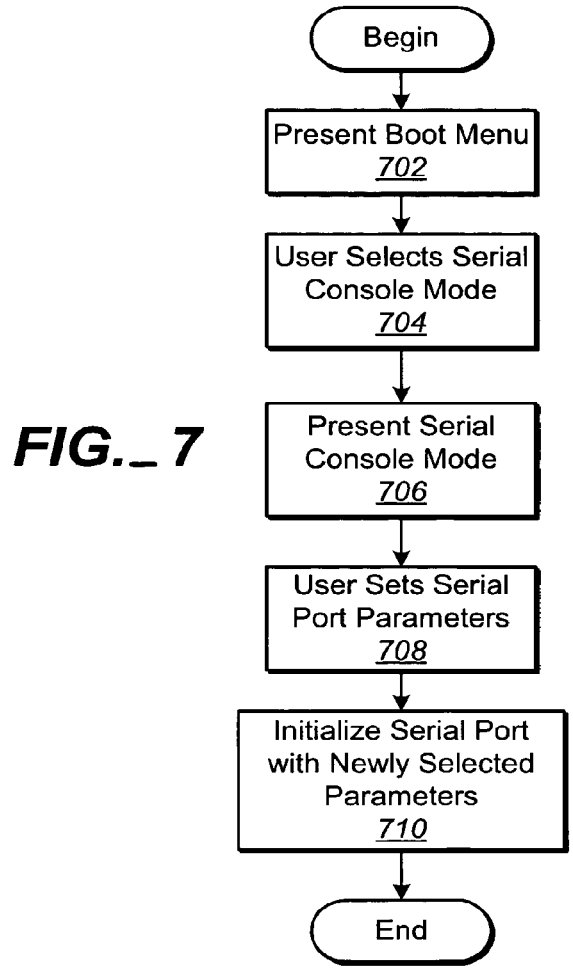
FIG._7

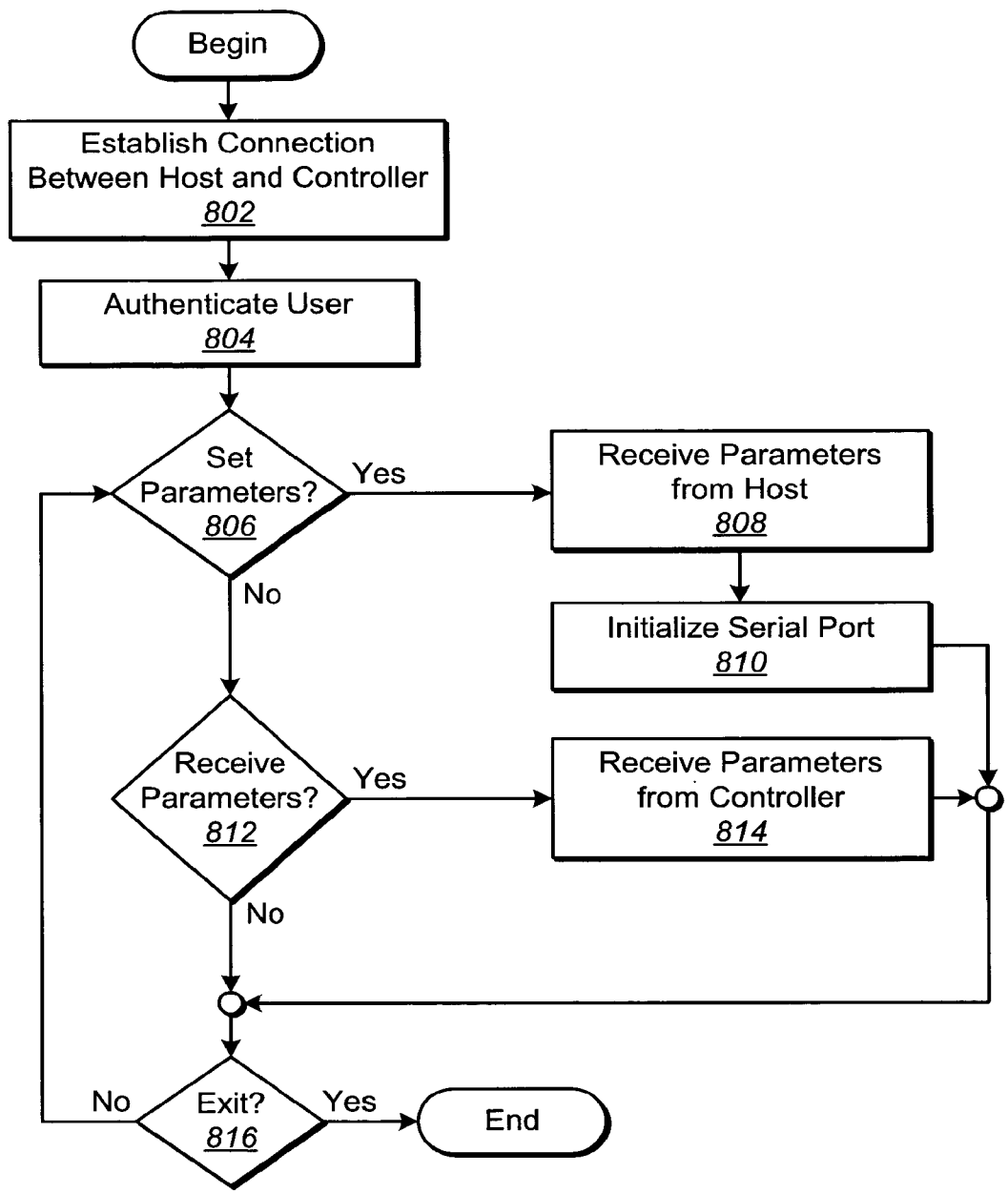
FIG._8

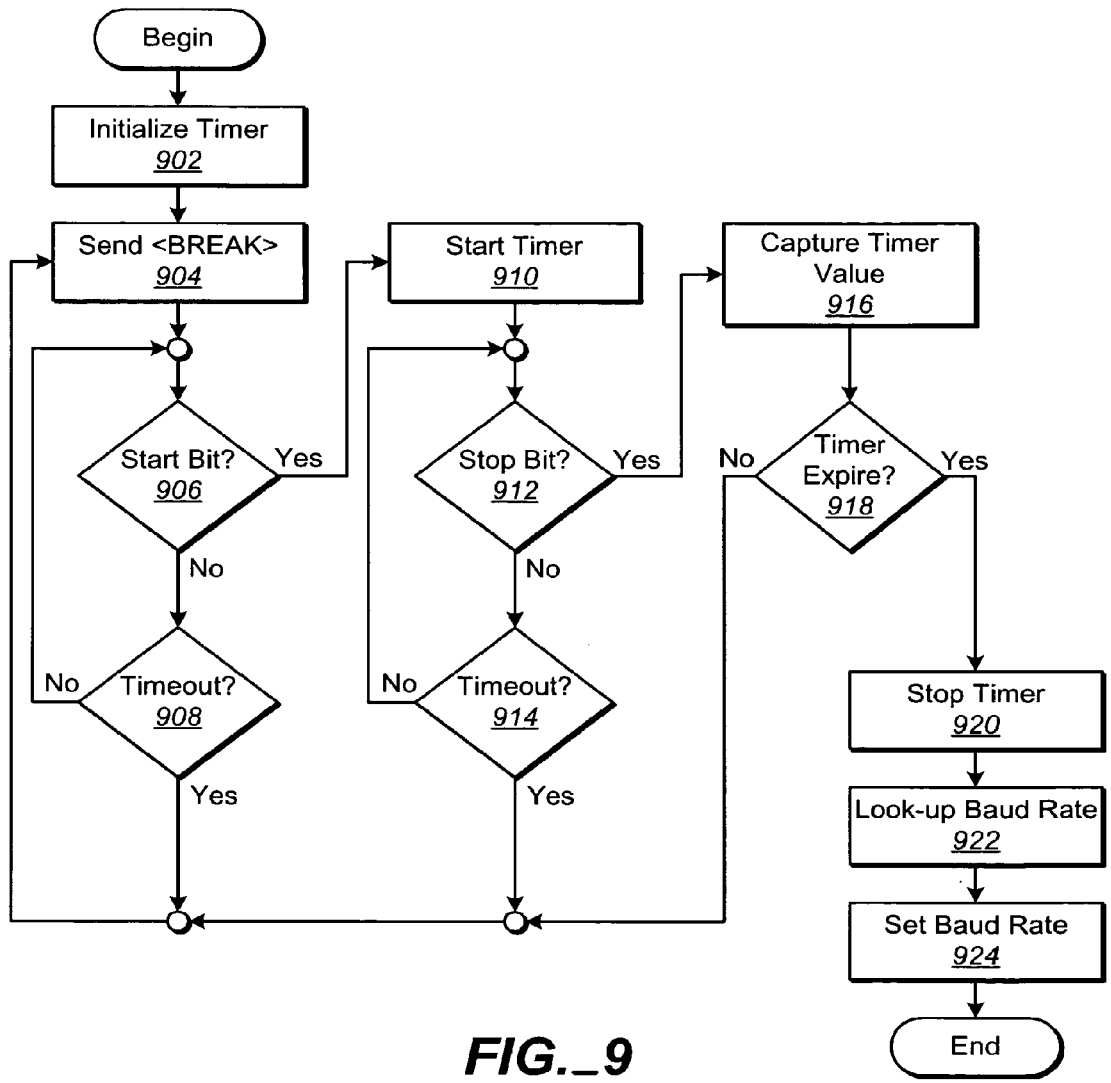
FIG._9

SERIAL PORT INITIALIZATION IN STORAGE SYSTEM CONTROLLERS

This application is a continuation of U.S. application Ser. No. 10/706,623, filed on Nov. 12, 2003, now U.S. Pat. No. 7,415,543, entitled, "Serial Port Initialization in Storage System Controllers."

BACKGROUND OF THE INVENTION

1. Technical Field

The present invention relates to storage controllers and, in particular, to redundant arrays of independent disks. Still more particularly, the present invention provides a method, apparatus, and program for serial port initialization on storage controllers.

2. Description of the Related Art

Redundant array of independent disks (RAID) is a disk subsystem that is used to increase performance and provide fault tolerance. RAID is a set of two or more ordinary hard disks and a specialized disk controller, referred to as a RAID controller, that contains the RAID functionality. RAID can also be implemented via software only, but with less performance, especially when rebuilding data after a failure.

RAID controller typically include a serial port for communication with an external device, such as a laptop computer or other maintenance device. An operator may connect an external device to the serial port of a RAID controller for maintenance, monitoring, or configuration. Both the controller and the external device have serial port parameter settings, such as, for example, baud rate, data bits, stop bits, parity, and flow control. The parameter settings must be synchronized for communication between the device and the controller to be effective. The controller typically only supports setting the baud rate of the serial port and no other parameter settings.

However, several problems exist for controllers with serial port communication. There are currently no default serial port parameters set for a controller's serial port during boot code initialization. When the controller downloads non-volatile static random access memory (NVSRAM) code, the controller may not be responsive for serial port communication. Also, the controller may not be responsive for serial port communication after swapping one of the controllers with a foreign controller and auto-code synchronization (ACS) has been completed.

Serial port initialization on RAID controllers poses many problems as port parameters are typically set by invoking a <BREAK> key sequence on the serial console. By repeating the break sequence, a user may cycle through baud rate values for the serial port. However, the user may not know how many times the break sequence was invoked and, thus, may not know what baud rate is set. The user may also miss the intended value and must restart the break key sequence. This solution for setting serial port parameters is non-intuitive and potentially frustrating.

SUMMARY OF THE INVENTION

The present invention recognizes the disadvantages of the prior art and provides improved serial port initialization for storage controllers. In an exemplary embodiment, the present invention provides a boot menu for manual setting of serial port parameters. A serial console mode may be added to the controller's boot menu. The serial console mode allows an operator to set serial port parameter values. After the user selects the serial port parameters, when the controller continues with the boot process, the serial port is initialized with the newly selected parameters.

The present invention also provides for manual setting of serial port parameters through an administrative management window at the host. The controller includes a software interface between the storage system and the host. An administrative management window interface resides on the host. Using the software interface of the controller via the administrative management interface host software, the serial port parameters may be configured. After the user selects the serial port parameters, the port may be initialized with the newly selected parameters.

In addition, the present invention provides an adaptive baud rate negotiation mechanism using the Universal Asynchronous Receiver Transmitter (UART) registers in the serial port. The adaptive baud rate negotiation is based on the return characters received from a break character from the serial console. The adaptive baud rate negotiation mechanism sets a default baud rate during controller boot up and waits for a return character to be received on an external device connected to the serial port. The mechanism checks for a start bit and a stop bit and uses a look-up table for the baud rate versus the bit pattern that is received. The mechanism then sets the baud rate based on the look-up table values.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a block diagram of a storage network is shown in accordance with a preferred embodiment of the present invention;

FIG. 2 depicts an example screen for a boot operations menu for a storage controller in accordance with an exemplary embodiment of the present invention;

FIG. 3 depicts an example screen for a serial interface mode menu for a storage controller in accordance with a preferred embodiment of the present invention;

FIGS. 4A-4B and 5A-5C illustrate an example of adaptive baud rate negotiation in accordance with a preferred embodiment of the present invention;

FIG. 6 depicts a look-up table for adaptive baud rate negotiation in accordance with a preferred embodiment of the present invention;

FIG. 7 is a flowchart illustrating serial port parameter setting using a serial interface mode menu for a storage controller in accordance with a preferred embodiment of the present invention;

FIG. 8 is a flowchart illustrating serial port parameter setting through an administrative management window in accordance with a preferred embodiment of the present invention; and FIG. 9 is a flowchart illustrating the operation of an adaptive baud rate negotiation mechanism in accordance with a preferred embodiment of the present invention.

DETAILED DESCRIPTION

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

With reference now to the figures and in particular with reference to FIG. 1, a block diagram of a storage network is shown in accordance with a preferred embodiment of the present invention. Host 102 connects to storage system 110 through storage system controller 112. The host is connected to the storage controller through a communications medium, such as Ethernet or Fibre Channel (FC). Storage controller 112 also has a serial port through which an external device, such as laptop computer 120, may be connected.

Storage system 110 may be, for example, a redundant array of independent disks (RAID) and, thus storage controller 112 may be a RAID controller. Both the controller and the external device have serial port parameter settings, such as, for example, baud rate, data bits, stop bits, parity, and flow control. The parameter settings must be synchronized for communication between the device and the controller to be effective.

In accordance with an exemplary embodiment of the present invention, storage system controller 112 includes a boot menu with a serial interface mode menu that allows a user to set serial port parameters. A user may connect to the storage controller from a device, such as host 102, using a telnet session, for example. The user then boots up the storage controller and enters the boot operation menu for the controller.

FIG. 2 depicts an example screen for a boot operations menu for a storage controller in accordance with an exemplary embodiment of the present invention. Window 200 is a telnet window for a telnet session with a storage controller. The boot operations menu includes a selection for a serial interface mode menu. If the user selects "10," the serial interface mode menu is presented.

FIG. 3 depicts an example screen for a serial interface mode menu for a storage controller in accordance with a preferred embodiment of the present invention. Window 300 shows a continuation of the telnet session with a storage controller. The serial interface mode menu includes additional default parameters that are selectable based on the host computer requirements. The default parameter list includes a high baud rate (115,200 bps), a low baud rate (9600 bps), a user selectable current baud rate, a number of data bits, a number of stop bits, a parity (even or odd), and flow control (Xon/Xoff/Hardware). After the user selects the serial port parameters and quits the serial interface mode menu, the controller continues with the boot process. The serial port will then be initialized with the newly selected parameters.

In accordance with an exemplary embodiment, the present invention provides for manual setting of serial port parameters through an administrative management window at the host. Returning to FIG. 1, controller 112 includes storage system interface software 114, which provides a software interface between the storage system and the host. The storage system interface software may be, for example, the SYMbol interface from LSI Logic Corporation. Administrative management window (AMW) interface software 104 resides on host 102. The AMW may be, for example, SANtricity host software from LSI Logic Corporation.

Using the software interface of the controller via the administrative management interface host software, the serial port parameters may be configured. Since the serial port debugging option is not a safe mode of operation from the end user's perspective, this manner of configuring the serial port parameters may be hard-coded password protected during the controller manufacturing process. After the user selects the serial port parameters, the port may be initialized with the newly selected parameters. The serial port may be initialized by invoking a controller reboot operation via the software interface or by attempting a hardware initialization to the Universal Synchronous Asynchronous Receiver Transmitter (USART) on the controller via the software interface. Serial port initialization does not require a full reboot of the storage controller.

Furthermore, the default serial port parameters should be downloaded to the controller from the AMW after a reboot sequence following a non-volatile static random access memory (NVSRAM) code download sequence. The host may store a set of serial port parameters and send this set of parameters to the controller to synchronize with the host or another device. The AMW may also provide an option to read the current working parameters of the controller's serial port in order to facilitate the setting of serial port parameters on the host or another device accordingly.

The present invention also provides an adaptive baud rate negotiation mechanism using the Universal Asynchronous Receiver Transmitter (UART) registers in the serial port. The adaptive baud rate negotiation is based on the return characters received from a break character from the serial console. The controller may have a UART chip on board that contains programmable baud rate generator that is capable of taking any clock input and dividing it by a divisor from 2 to 65,535. The output frequency of the baud rate generator is sixteen times the baud [divisor #=(frequency input)/(baud rate·16)]. Two 8-bit latches store the divisor in a 16-bit binary format. The divisor latches must be loaded during initialization to ensure proper baud rate selection and operation of the baud generator. Upon loading either of the divisor latches, a 16-bit baud counter is immediately loaded.

The adaptive baud rate negotiation mechanism sets a default baud rate, such as 9600 bps, during controller boot up and waits for a return character to be received on an external device connected to the serial port after sending a <BREAK> from the serial console. The time taken to transmit a bit depends on the baud rate set on the UART. In the time for transmitting a single bit using 9600 bps, two bits may be transmitted if 19,200 bps is used. Hence, starting an arbitrary timer as soon as the <BREAK> is transmitted and terminating the timer upon receiving a return character from the terminal can compute the time taken to receive the character on the console.

The adaptive baud rate negotiation mechanism waits for a start bit (falling edge) on the serial input pin and then starts the timer. At every subsequent rising edge of the serial data, the timer value is captured and saved. When the timer expires, the last captured value will indicate the duration of the serial character from the start bit to the last zero-to-one transition.

FIGS. 4A-4B and 5A-5C illustrate an example of adaptive baud rate negotiation in accordance with a preferred embodiment of the present invention. If the sender's baud rate is at 4800 and the receiver's baud rate is at 9600, then for every one bit transmitted by the sender, the receiver will receive two bits. For a break key (0x03H), the sent bits may be as shown in FIG. 4A. The least significant bits are transferred first. The received bits may be as shown in FIG. 4B.

If the sender's baud rate is 9600 and the receiver's baud rate is 4800, then for every two bits transmitted by the sender, the receiver will receive one bit. For a break key (0x03H), the sent pattern of bits is as shown in FIG. 5A. The received pattern of bits may be as shown in FIG. 5B. Since the first four bits might result in an ambiguous state at the receiver due to the two pairs (0 and 1) and (1 and 0), the interpretation may be built into the code so as to interpret 0-and-1 as a 0 (zero) and to interpret 1-and-0 as a 1 (one). Hence, the normalized pattern at the receiver may be as shown in FIG. 5C.

Based on the above patterns of bits, a look-up table may be provided to determine a baud rate of a receiver based on the baud rate of the sender. FIG. 6 depicts a look-up table for adaptive baud rate negotiation in accordance with a preferred embodiment of the present invention.

The look-up table contains a maximum timer value that is measured for a particular baud rate. The values are chosen so as to represent a time interval of four data bit time plus the start bit time. For lower baud rates (below T/2), the mechanism waits for two bytes to be received at the receiver before estimating the baud rate. The result may be erroneous if the calculation is based on one single byte, because a single byte may not contain the entire string of data intended to be transmitted by the sender.

FIG. 7 is a flowchart illustrating serial port parameter setting using a serial interface mode menu for a storage controller in accordance with a preferred embodiment of the present invention. The process begins and presents a boot menu (step 702). The user selects the serial console mode option in the boot menu (step 704) and the process presents the serial console mode menu (step 706). Then, the user sets the serial port parameters using the serial console mode menu (step 708). Thereafter, the process initializes the serial port with the newly selected parameters (step 710) and ends.

Turning now to FIG. 8, a flowchart illustrating serial port parameter setting through an administrative management window is shown in accordance with a preferred embodiment of the present invention. The process begins and establishes a connection between the host and the storage controller (step 802). The process then authenticates the user (step 804). A determination is made as to whether the user selects to set parameters (step 806).

If the user selects to set parameters, the process receives the parameters from the host (step 808). The parameters may be received from the host as user input or as a set of default parameters. For example, the host may provide a set of default parameters after a reboot sequence following a NVSRAM code download sequence. Thereafter, the process initializes the serial port using the parameters received from the host (step 810).

If the user does not select to set parameters in step 806, a determination is made as to whether the user wishes to receive parameters from the controller (step 812). If the user wishes to receive parameters from the storage controller at the host for synchronization, the process sends the parameters from the controller to the host (step 814).

If the user does not wish to receive parameters from the controller at the host or after initializing the serial port in step 810 or after sending the parameters from the controller to the host in step 814, a determination is made as to whether an exit condition exists. An exit condition may exist, for example, if the user closes the administrative management window interface software at the host or disconnects from the controller. If an exit condition exists, the process ends. Otherwise, the process returns to step 806 to determine whether the user selects to set parameters.

With reference now to FIG. 9, a flowchart is shown illustrating the operation of an adaptive baud rate negotiation mechanism in accordance with a preferred embodiment of the present invention. The process begins and initializes a timer (step 902). Then, the process sends a <BREAK> key sequence from an external device to the controller (step 904). A determination is made as to whether a start bit is received (step 906). If a start bit is not received, a determination is made as to whether a timeout occurs (step 908). If a timeout does not occur, the process returns to step 906 to determine whether a start bit is received. Steps 906 and 908 repeat until a start bit is received or a timeout occurs. If a timeout occurs in step 908, the process returns to step 904 to send a new <BREAK> key sequence.

If a start bit is received in step 906, the process starts the timer (step 910) and a determination is made as to whether a stop bit is received (step 912). If a stop bit is not received, a determination is made as to whether a timeout occurs (step 914). If a timeout does not occur, the process returns to step 912 to determine whether a stop bit is received. Steps 912 and 914 repeat until a stop bit is received or a timeout occurs. If a timeout occurs in step 908, the process returns to step 904 to send a new <BREAK> key sequence.

If a stop bit is received in step 912, the process captures the timer value (step 916) and a determination is made as to whether the timer is expired (step 918). If the timer is not expired, the process returns to step 904 to send a new <BREAK> key sequence. If the timer is expired in step 918, the process stops the timer (step 920) and performs a look-up of the baud rate (step 922). Thereafter, the process sets the baud rate (step 924) and ends.

Thus, the present invention solves the disadvantages of the prior art by providing mechanisms for manually setting serial port parameters on a storage controller. An operator may set serial port parameters using a boot operations menu or through interface software at a host computer. The present invention also provides adaptive baud rate negotiation mechanism for automatically setting the baud rate for a serial port. These mechanisms may be used separately or together in a storage controller, such as a RAID controller. An operator may then quickly and conveniently perform serial port communications using an external device for maintenance or other operations.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

What is claimed is:

1. A method of initializing a serial port in a storage system controller that connects to an external device using the serial port, the method comprising:

enabling a serial control mode via a boot operations menu displayed on a host device that is coupled to the storage system controller using a network connection activated during a boot process of the storage system controller, wherein the boot operations menu is displayed in a telnet window that is displayed during a telnet session with the storage system controller;

displaying a serial control mode menu on the host device in response to enabling the serial control mode;

receiving, from options selected in the serial control mode menu, a plurality of parameter values for the serial port of the storage system controller;

initializing the serial port on the storage system controller with the plurality of parameter values during the boot process of the storage system controller by attempting, using a software interface on the host device, a hardware initialization to a universal synchronous asynchronous receiver transmitter (USART) in the serial port;

wherein the serial port on the storage system controller is initialized with the plurality of parameter values without completing the boot process of the storage system controller;

wherein the plurality of parameter values are received from a user, and wherein the plurality of parameter values include a baud rate, and further wherein receiving the plurality of parameter values includes performing an adaptive baud rate negotiation between the storage system controller and the external device through the serial port, and wherein performing the adaptive baud rate negotiation includes:

sending a break key sequence from the external device to the storage system controller;

determining an amount of time between a start bit and a stop bit; and obtaining a baud rate based on the amount of time between the start bit and the stop bit; and wherein the method further comprises initializing the serial port on the storage system controller using the at least one serial port parameter value.

2. The method of claim 1, wherein the options selected in the serial control mode menu include default parameters that are based on requirements of the host device, further comprising:

downloading the default parameters to the storage system controller following a non-volatile static random access memory (NVSRAM) code download sequence.

3. The method of claim 1, further comprising:

wherein the storage system controller comprises a hard-coded password; and authenticating an operator of the host device before receiving the plurality of parameter values from the host device.

4. The method of claim 1, wherein the plurality of parameter values include at least one of a baud rate, a number of data bits, a number of stop bits, a parity, and a flow control.

5. The method of claim 1, further comprising: performing an adaptive baud rate negotiation between the storage system controller and the external device using Universal Asynchronous Receiver Transmitter (UART) registers that are included in the serial port.

6. The method of claim 1, wherein the network connection is an Ethernet connection.

7. The method of claim 1, wherein the network connection is a Fibre Channel connection.

8. The method of claim 1, wherein the external device has device parameter settings, and further comprising:

synchronizing the device parameter settings with the plurality of parameter values for the serial port of the storage system controller, wherein the device parameter settings must be synchronized with the plurality of parameter values for the serial port of the storage system controller before the external device can communicate with the storage system controller.

9. A storage network, comprising:

a storage system;

a storage system controller, wherein the storage system controller provides access to the storage system and wherein the storage system controller includes a serial port;

a host device coupled to the storage system controller using a network connection; and an external computer coupled to the storage system controller through the serial port, wherein a serial control mode is enabled via a boot operations menu displayed on the host device, wherein the boot operations menu is displayed in a telnet window that is displayed during a telnet session with the storage system controller;

wherein a serial control mode menu is displayed on the host device in response to enabling the serial control mode;

wherein a plurality of parameter values for the serial port of the storage system controller are received using options in the serial control mode menu during a boot process of the storage system controller;

wherein the serial port on the storage system controller is initialized with the plurality of parameter values during the boot process of the storage system controller by attempting, using a software interface on the host device, a hardware initialization to a universal synchronous asynchronous receiver transmitter (USART) in the serial port;

wherein the serial port on the storage system controller is initialized with the plurality of parameter values without completing the boot process of the storage system controller;

wherein the plurality of parameter values are received from a user, and wherein the plurality of parameter values includes a baud rate, and further wherein an adaptive baud rate negotiation is performed between the storage system controller and the external device through the serial port, and wherein the adaptive baud rate negotiation is performed by:

sending a break key sequence from the external device to the storage system controller;

determining an amount of time between a start bit and a stop bit; and obtaining a baud rate based on the amount of time between the start bit and the stop bit; and wherein the serial port on the storage system controller is initialized using the at least one serial port parameter value.

10. The storage network of claim 9, wherein the options of the serial console mode menu include default parameters that are based on requirements of the host computer and wherein the default parameters are downloaded to the storage system controller following a non-volatile static random access memory (NVSRAM) code download sequence.

11. The storage network of claim 9, wherein the storage system controller comprises a hard-coded password that authenticates an operator of the host device before receiving the plurality of serial port parameter values from the host device.

12. The storage network of claim 9, wherein the plurality of parameter values include at least one of a baud rate, a number of data bits, a number of stop bits, a parity, and a flow control.

13. The storage network of claim 9, wherein the plurality of parameter values include a baud rate, and wherein the external device performs an adaptive baud rate negotiation between the storage system controller and the external device, wherein the adaptive baud rate negotiation is performed using Universal Asynchronous Receiver Transmitter (UART) registers that are included in the serial port.

14. The storage network of claim 9, wherein the network connection is an Ethernet connection.

15. The storage network of claim 9, wherein the network connection is a Fibre Channel connection.

16. The storage network of claim 9, wherein the external device has device parameter settings, and further comprising: wherein the device parameter settings are synchronized with the plurality of parameter values for the serial port of the storage system controller, wherein the device parameter settings must be synchronized with the plurality of parameter values for the serial port of the storage system controller before the external device can communicate with the storage system controller.

* * * * *